United States Patent
Collings et al.

(10) Patent No.: US 9,351,168 B2
(45) Date of Patent: May 24, 2016

(54) DYNAMIC NETWORK CONFIGURATION

(75) Inventors: Iain Bruce Collings, Roseville Chase (AU); Wei Ni, Marsfield (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 399 days.

(21) Appl. No.: 13/515,940

(22) PCT Filed: Jun. 29, 2011

(86) PCT No.: PCT/AU2011/000801
§ 371 (c)(1),
(2), (4) Date: Aug. 10, 2012

(87) PCT Pub. No.: WO2012/000032
PCT Pub. Date: Jan. 5, 2012

(65) Prior Publication Data
US 2012/0307756 A1 Dec. 6, 2012

Related U.S. Application Data

(60) Provisional application No. 61/362,250, filed on Jul. 7, 2010.

(30) Foreign Application Priority Data

Jun. 29, 2010 (AU) ................ 2010902880

(51) Int. Cl.
*H04W 16/02* (2009.01)
*H04W 24/02* (2009.01)
*H04W 88/08* (2009.01)

(52) U.S. Cl.
CPC .............. *H04W 16/02* (2013.01); *H04W 24/02* (2013.01); *H04W 88/085* (2013.01)

(58) Field of Classification Search
USPC ........... 343/876; 370/235, 252, 468; 455/129, 455/277, 422.1, 452
See application file for complete search history.

(56) References Cited

U.S. PATENT DOCUMENTS

| | | | |
|---|---|---|---|
| 5,021,801 A * | 6/1991 | Smith et al. | 343/876 |
| 5,442,804 A | 8/1995 | Gunmar et al. | |
| 5,491,833 A * | 2/1996 | Hamabe | 455/422.1 |
| 6,141,565 A | 10/2000 | Feuerstein et al. | |
| 6,223,041 B1 | 4/2001 | Egner et al. | |
| 6,434,392 B1 * | 8/2002 | Posti | 455/452.1 |
| 6,842,431 B2 | 1/2005 | Clarkson et al. | |

(Continued)

OTHER PUBLICATIONS

International Bureau of WIPO, International Preliminary Report on Patentability, PCT/AU2011/000801, Jan. 8, 2013.

(Continued)

*Primary Examiner* — Jung Park
*Assistant Examiner* — Chuong M Nguyen
(74) *Attorney, Agent, or Firm* — Wood, Herron & Evans, LLP

(57) ABSTRACT

Disclosed is a wireless communication system comprising a plurality of antennas, a plurality of base stations, each base station being adapted to connect to one or more of the antennas over an available spectrum, and a wireless switching module. The wireless switching module is adapted to allocate one or more portions of the available spectrum to each antenna dependent on a compatibility constraint on the antennas, and assign each antenna for connection to a base station.

12 Claims, 9 Drawing Sheets

(56) References Cited

U.S. PATENT DOCUMENTS

| | | |
|---|---|---|
| 6,940,838 B1 | 9/2005 | Stead |
| 7,031,755 B2 | 4/2006 | Li et al. |
| 7,630,739 B2 | 12/2009 | Murakami et al. |
| 7,961,618 B1 * | 6/2011 | Prasad et al. .................. 370/235 |
| 2003/0114165 A1 | 6/2003 | Mills |
| 2004/0190477 A1 | 9/2004 | Olson et al. |
| 2005/0007993 A1 | 1/2005 | Chambers et al. |
| 2006/0276227 A1 | 12/2006 | Dravida |
| 2007/0173260 A1 | 7/2007 | Love et al. |
| 2008/0170525 A1 | 7/2008 | Geiger |
| 2008/0248805 A1 | 10/2008 | Han et al. |
| 2009/0061940 A1 | 3/2009 | Scheinert et al. |
| 2009/0168712 A1 | 7/2009 | Douglas et al. |
| 2010/0041355 A1 * | 2/2010 | Laroia et al. .................. 455/129 |

OTHER PUBLICATIONS

Australian Patent Office, International Search Report, PCT/AU2011/000801, Sep. 29, 2011 (2 pgs.).

European Patent Office, Extended European Search Report and Search Opinion issued in corresponding European Patent Application No. 11799963, dated Dec. 14, 2015 (8 pages).

* cited by examiner

DYNAMIC NETWORK CONFIGURATION

FIELD

The present invention is related to wireless communication and in particular to resource allocation for wireless network communication, including spectrum and infrastructure resources.

BACKGROUND

Spectrum is a scare resource in wireless communication systems, and is often poorly utilized. In conventional wireless networks, spectrum allocation is fixed (non-adaptive) during network planning and deployment, based on statistical characteristics of previous measured traffic. However, in practice, wireless traffic occurs in bursts, over a number of different time scales. As such, the conventional fixed allocation approach that does not adapt to traffic dynamics leads to potentially large durations when significant spectrum is underutilized, or even unused.

In existing indoor wireless networks, spectral utility (the ratio of usage to allocation) is particularly low for two reasons. Firstly, indoor deployment is traffic-oriented rather than coverage-oriented (as in outdoor networks), and a large amount of spectral resources are allocated for the expected traffic peaks. Secondly, interference cannot be coordinated due to the complicated indoor environments, and orthogonal spectrum allocation is therefore extensively employed. As a result, more spectrum and more infrastructure such as base stations are allocated than are truly necessary to handle the wireless traffic.

In conventional outdoor wireless networks, such as cellular and sensor networks, spectral utility is also relatively low. Resources such as spectrum and base stations are typically allocated to fixed, uniformly-sized cells to provide seamless coverage. However, the users' spatial distribution and consequently the spatial distribution of traffic are not uniform between cells. As such, the conventional approach of fixed cell allocation leads to an underuse of resources at some sparsely populated cells while also often failing to satisfy the traffic requests in other, heavily populated cells. This results in the inefficient utilization of spectrum, and the effective system capacity is low.

SUMMARY

Disclosed are arrangements which, seek to address one or more of the above problems by enabling a wireless network to dynamically allocate resources, including spectrum and base stations, so as to adapt to temporally and geographically varying traffic patterns.

According to a first aspect of the present disclosure, there is provided a wireless communication system comprising: a plurality of antennas; a plurality of base stations, each base station being adapted to connect to one or more of the antennas over an available spectrum; and a wireless switching module adapted to allocate one or more portions of the available spectrum to each antenna dependent on a compatibility constraint on the antennas, and assign each antenna for connection to a base station.

According to a second aspect of the present disclosure, there is provided a method of dynamically configuring a wireless communication system comprising a plurality of antennas and a plurality of base stations, each base station being adapted to connect to one or more of the antennas over an available spectrum. The method comprises allocating one or more portions of the available spectrum to each antenna; and assigning each antenna for connection to a base station, wherein the allocating is dependent on a compatibility constraint on the antennas.

According to a third aspect of the present disclosure, there is provided a device in a wireless communication system comprising a plurality of antennas and a plurality of base stations, each base station being adapted to connect to one or more of the antennas over an available spectrum, the device being adapted to allocate one or more portions of the available spectrum to each antenna dependent on a compatibility constraint on the antennas, and assign each antenna for connection to a base station.

A beneficial result of the disclosed arrangements is that when a large amount of bandwidth requests occur in an area, more base stations are connected to the antennas serving that area, thereby allocating more spectrum and processing capability. Meanwhile, fewer base stations are connected to the antennas providing coverage for low-traffic areas.

BRIEF DESCRIPTION OF THE DRAWINGS

One or more embodiments will now be described with reference to the drawings, in which.

DETAILED DESCRIPTION

Figure 1:
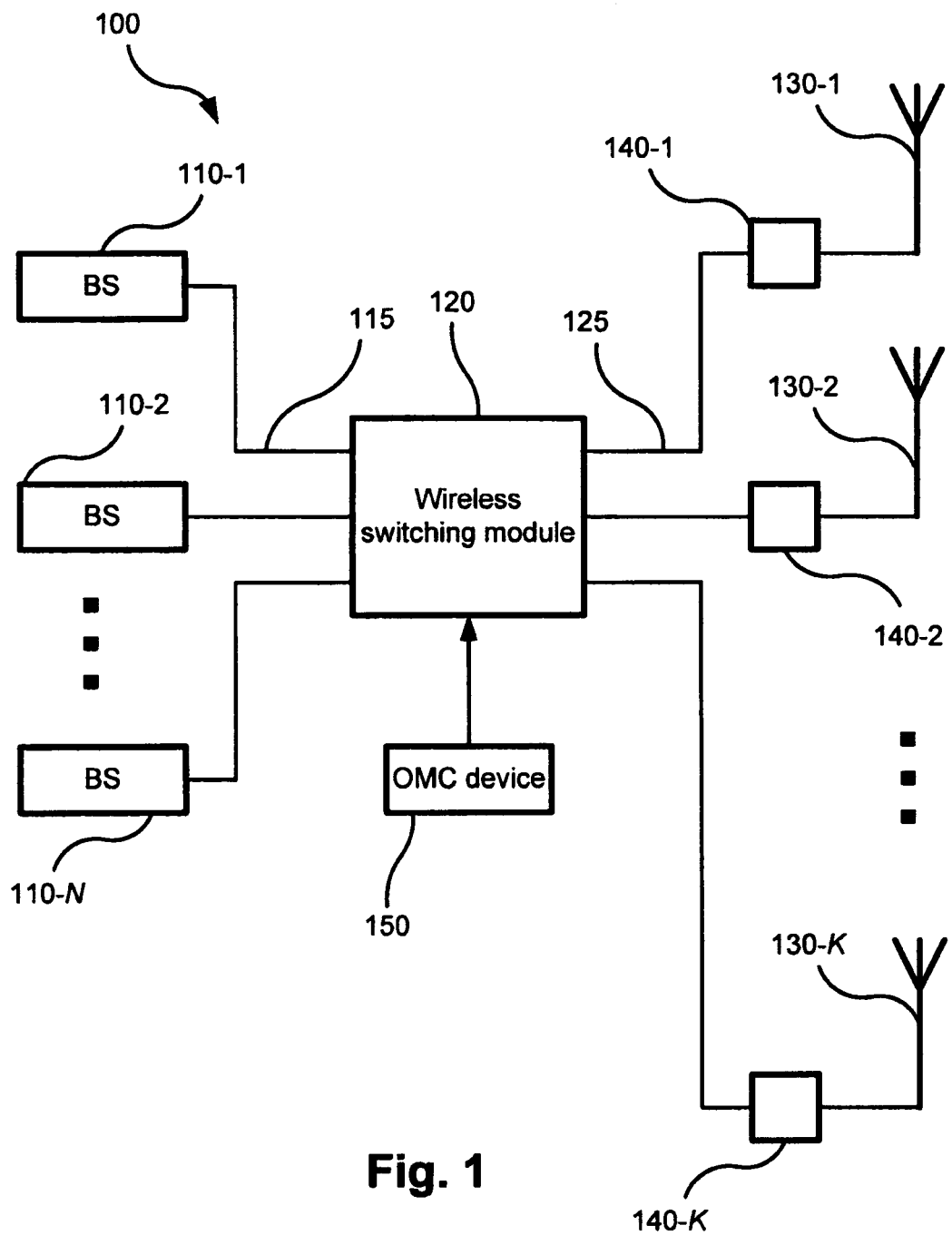
FIG. 1 is a block diagram of a bidirectional wireless communication system.

Where reference is made in any one or more of the accompanying drawings to steps and/or features, which have the same reference numerals, those steps and/or features have for the purposes of this description the same function(s) or operation(s), unless the contrary intention appears.

FIG. 1 is a block diagram of a' bidirectional wireless communication system 100 according to one embodiment. The system 100 comprises N base stations 110-1, 110-2, . . . , 110-N, each of which is a source of and sink for an associated one of the in-phase and quadrature (I-Q) signals, e.g. 115.

The term "base station" as used in this disclosure refers to a baseband and radio frequency (RF) signal processing unit. There are two types of base station, defined by their relationship to the wireless spectrum available for use by the wireless communication system 100. One type only sends and receives signals within a portion, or channel, of the available spectrum; for example, an FDMA (frequency division multiple access) processing unit. Therefore, multiple base stations of this type are needed to cover the whole spectrum and still more base stations are needed for channel reuse. The other type of base station sends and receives signals across the whole available spectrum, for example, an OFDMA (orthogonal frequency division multiple access) processing unit. Multiple base stations of this type are needed to be able to employ channel reuse, although fewer than for the first type. A channel may be of variable width and comprises one or more FDMA carriers or OFDMA subcarriers.

The system 100 also comprises K antennas 130-1, 130-2, ..., 130-K, each of which is a source of and sink for signals, e.g. 125, that are processed to/from the signals 115 associated with the base stations 110-n by an associated amplifier/filter 140-i. The antennas 130-i convert those signals from/to signals received/transmitted wirelessly. Each antenna 130-i can transmit and receive signals on multiple channels simultaneously. However, the spatial arrangement of the antennas 130-i means that certain antennas cannot transmit/receive on the same channel without mutual interference. Such antennas are termed "incompatible".

The base stations 110-n are connected to the antennas 130-i via a wireless switching module 120, which is able to route signals from/to any base station 110-n to/from any antenna 130-i.

The wireless switching module 120 is connected to an Operation and Maintenance Centre (OMC) device 150, which is a standard-independent server.

The signals 115 between the wireless switching module 120 and the base stations 110-n may be either RF or digital baseband signals. The signals 125 between the wireless switching module 120 and the antennas 130-i are RF signals.

The wireless switching module 120 executes a method, to be described below, that configures the routing of signals within the system 100 dynamically between configuration intervals, dependent on bandwidth requirements associated with each antenna 130-i during each configuration interval. A typical configuration interval is of the order of a few minutes.

The antennas 130-i are fixed in location. Assuming each antenna 130-i serves a specific area relative to the antenna location, the wireless switching module 120 computes a bandwidth requirement associated with each antenna 130-i for each configuration interval as described below.

The dynamic configuration of the system 100 by the wireless switching module 120 has the effect that when a large amount of bandwidth requests occur in an area, more base stations 110-n (up to a maximum of one per antenna) are connected to the antennas 130-i serving that area, thereby allocating more spectrum and processing capability. Meanwhile, fewer base stations 110-n are connected to the antennas 130-i providing coverage for low-traffic areas. If each base station is identified with a "cell" of the wireless communication system 100, the areas covered by the cells are therefore dynamically defined in response to varying wireless traffic distribution.

The dynamic, or adaptive, configuration of the system 100 by the wireless switching module 120 allows the system 100 to operate in a more resource-efficient way than conventional wireless networks. That is, given the same resources as a conventional system, more traffic can be handled, or conversely, fewer resources are needed to handle a given load of traffic requests. In addition, adaptive configuration significantly decreases manual efforts required for network maintenance and upgrades. The adaptive architecture can reduce the overall power consumption of the system 100 as a result of efficient allocation of resources.

In alternative arrangements, the base stations 110-n in the system 100 are operated by different telecommunications carriers. The antennas 130-i associated with a given carrier are connected to a base station 110-n operated by that carrier. In such arrangements, reconfiguration of the system 100 by the wireless switching module 120 takes place in response to a change in circumstances, such as one or more antennas changing their carrier association to a different telecommunications carrier.

Figure 2A:
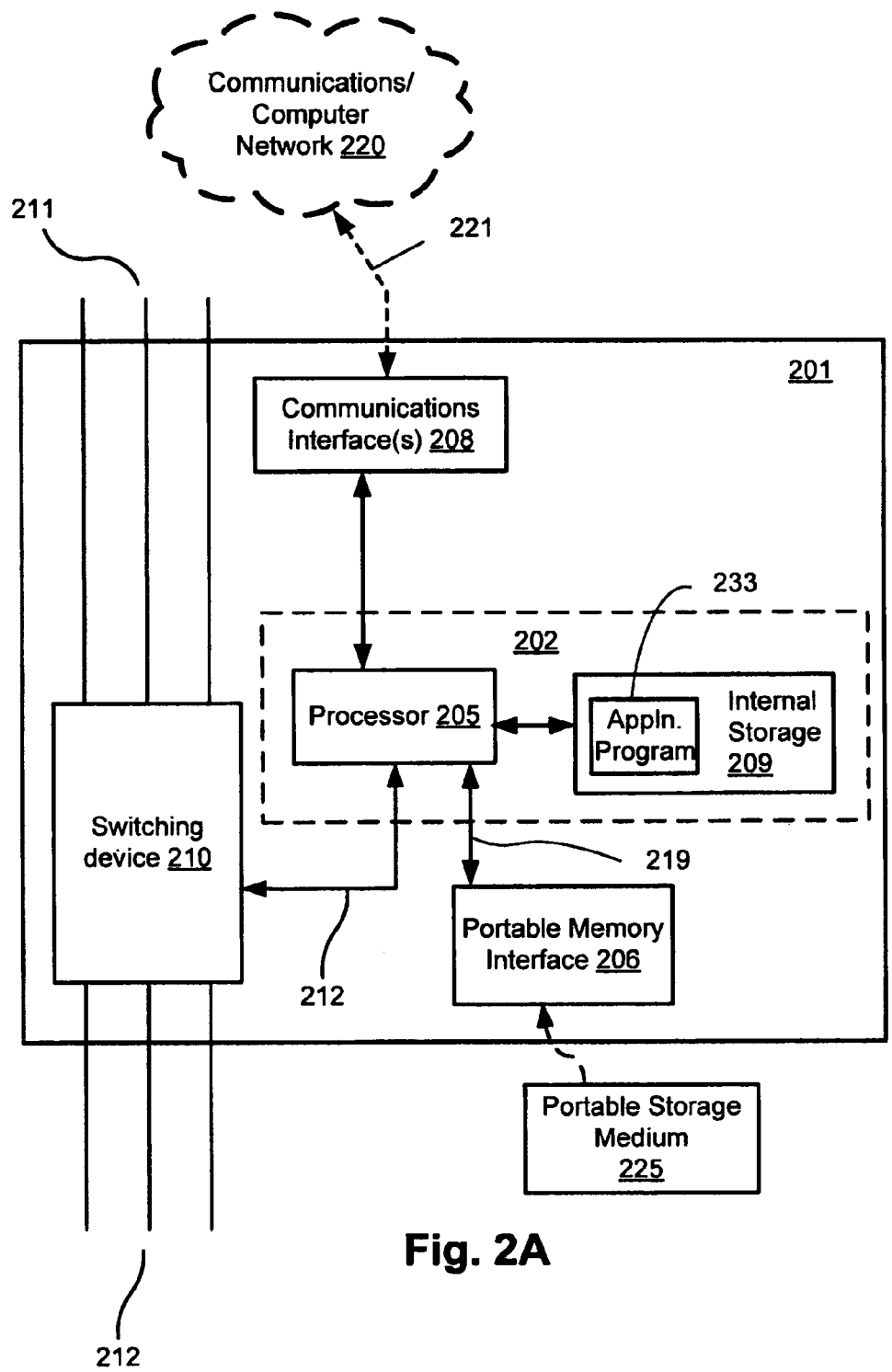
FIGS. 2A and 2B collectively form a schematic block diagram representation of an electronic device as which the wireless switching module in FIG. 1 may be implemented.
Figure 2B:
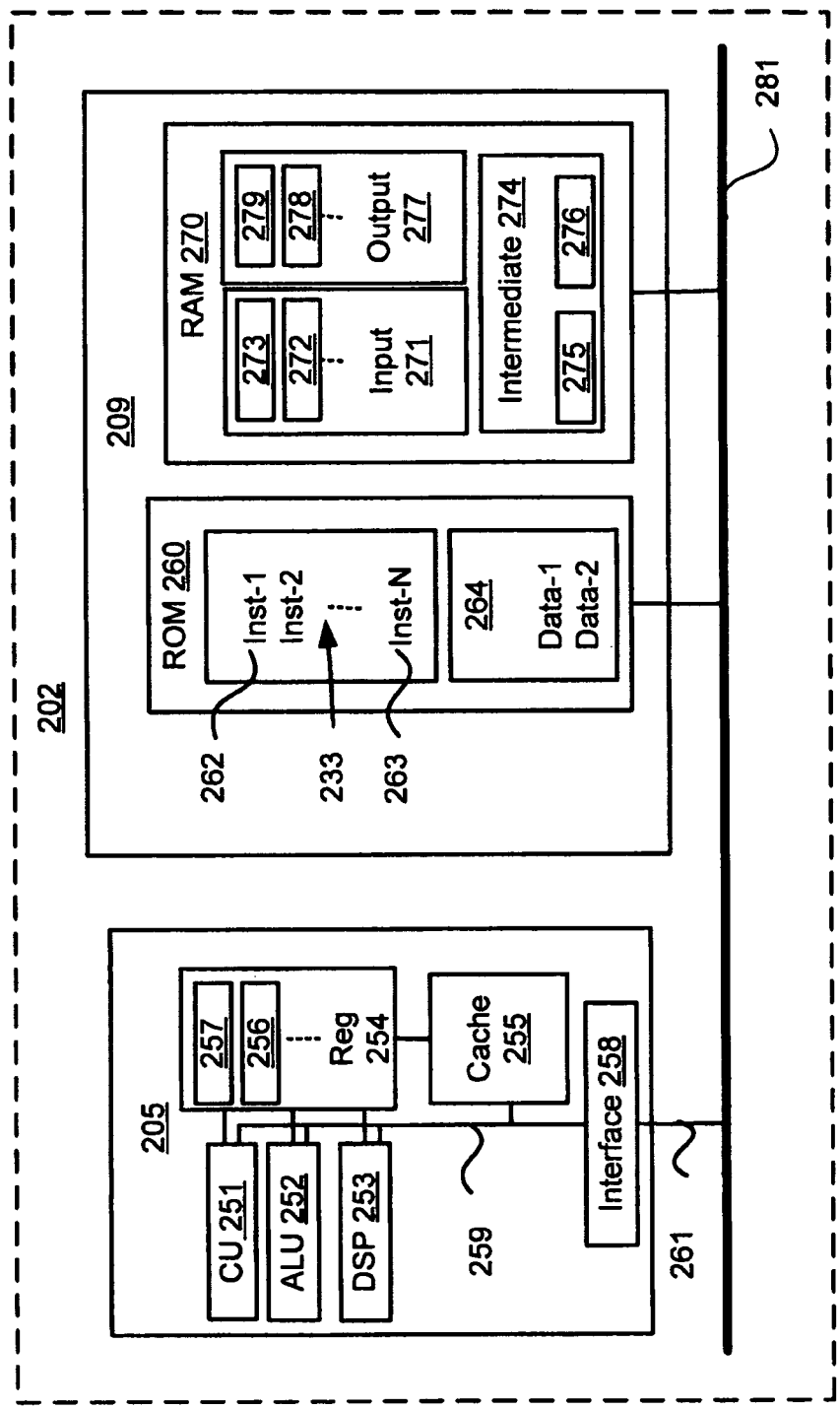

FIGS. 2A and 2B collectively form a schematic block diagram of a general purpose electronic device 201 including embedded components, as which the wireless switching module 120 may be implemented. As seen in FIG. 2A, the electronic device 201 comprises an embedded controller 202. Accordingly, the electronic device 201 may be referred to as an "embedded device". In the present example, the controller 202 has a processing unit (or processor) 205 which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

As seen in FIG. 2A, the electronic device 201 also comprises a switching device 210, which is coupled to the processor 205 via a connection 212. The switching device 210, controlled by the processor 205, is adapted to join connections 211 to connections 212 in any order. In the case of the wireless switching module 120, the connections 211 come from the base stations 110-n and the connections 212 come from the antennas 130-i.

As seen in FIG. 2A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The methods described hereinafter may be implemented as one or more software application programs 233 executable within the embedded controller 202. The electronic device 201 of FIG. 2A implements the described methods. In particular, with reference to FIG. 2B, the steps of the described methods are effected by instructions in the software 233 that are carried out within the controller 202. The software instructions may be formed as one or more code modules, each for performing one or more particular tasks.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more CD-ROM (not shown) and read via the portable memory interface 206 of FIG. 2A prior to storage in the internal storage module 209 or in the portable memory 225. In another alternative, the software application program 233 may be read by the processor 205 from the network 220, or loaded into the controller 202 or the portable storage medium 225 from other computer readable media. Computer readable storage media refers to any storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201.

Examples of computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 though 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the electronic device 201. Typically, the application program 233 waits for events and subsequently executes the block of code associated with that event. Events may be triggered in response to input from a user, via the user input devices 213 of FIG. 2A, as detected by the processor 205. Events may also be triggered in response to other sensors and interfaces in the electronic device 201.

The execution of a let of the instructions may require numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods to be described below is associated with one or more segments of the application program 233, and is performed by repeated execution of a fetch-execute cycle in the processor 205 or similar programmatic operation of other independent processor blocks in the electronic device 201.

There are two scenarios at which the embodiments of the invention are directed. In Case I, antennas 130-$i$ connected to a common base station 110-$n$ cannot transmit or receive in the same channel. In Case II, antennas 130-$i$ connected to a common base station 110-$n$ can transmit or receive in the same channel.

Conventional indoor distributed antenna systems are an example of Case II, where each base station outputs multiple replicas of identical radio frequency signals to multiple antennas in the downlink by using a splitter. In the uplink, the base station receives a combination of RF signals from these antennas. The connections between base stations and antennas are conventionally fixed when the systems are deployed, and frequencies are configured manually. Therefore no capability of dynamic traffic load balancing is available.

To implement adaptive connection between base stations 110-$n$ and antennas 130-$i$, and adaptive allocation of channels, within conventional systems, the following constraints are confronted in terms of compatibility with commercial base station devices.

For commercial base station devices, the only available output from and input to the wireless switching module 120 should be RF signals.

The wireless switching module 120 and methods carried out thereby should be independent of standards and base station devices, especially hardware.

A Case II base station 110-$n$ cannot compute the bandwidth requirement of each antenna 130-$i$ if multiple antennas 130-$i$ are connected to it in the same channel, because the base station processes the combined signals from the multiple antennas.

The architecture of the wireless switching module 120 depends on the deployment scenario. In Case I, in which antennas connected to a common base station exclusively occupy particular channels, there are three approaches, depending on the type of base station in use:

1. (FDMA base stations) The wireless switching module 120 comprises a filter for each antenna 130-$i$. Each antenna 130-$i$ receives or transmits on a subset of the FDMA carriers allocated to its connected base station 110-$n$.
2. (FDMA or OFDMA base stations) The wireless switching module 120 comprises an extra radio frequency module and a digital processing module. Therefore, the wireless switching module 120 is able to convert the signals from the base stations 110-$n$ to baseband (digital baseband for OFDMA systems or analogue baseband for FDMA systems), and regenerate antenna-specific signals according to the configured connections and channel allocation.
3. (OFDMA base stations) The wireless switching module 120 comprises the RF part and the inverse fast-Fourier transform part of the digital processing. In this approach the signals 115 are digital (baseband) signals. The wireless switching module 120 is thus capable of dispatching particular OFDMA subcarriers to a certain antenna 130-$i$. This architecture may become a standard indoor network element, either industrial standard or vendors' product specification.

Identical methods of allocating antenna-specific channels and connecting base stations 110-$n$ to antennas 130-$i$ apply to the three approaches for Case I. In approaches 1 and 2, no hardware modification is imposed on commercial base stations.

In Case II, the wireless switching module 120 connects base stations 110-$n$ to antennas 130-$i$ and determines the allocation of channels for each base station 110-$n$. Once the antennas 130-$i$ and base stations 110-$n$ are connected, the wireless switching module 120 replicates and routes RF signals between base stations 110-$n$ and antennas 130-$i$. Because signals from a base station 110-$n$ are broadcast to all of its connected antennas 130-$i$, the update of the connections between base stations and antennas is transparent to the schedulers in the base stations (or other upper layer network elements). No change is needed to commercial base station devices, either in hardware or software.

Figure 3:
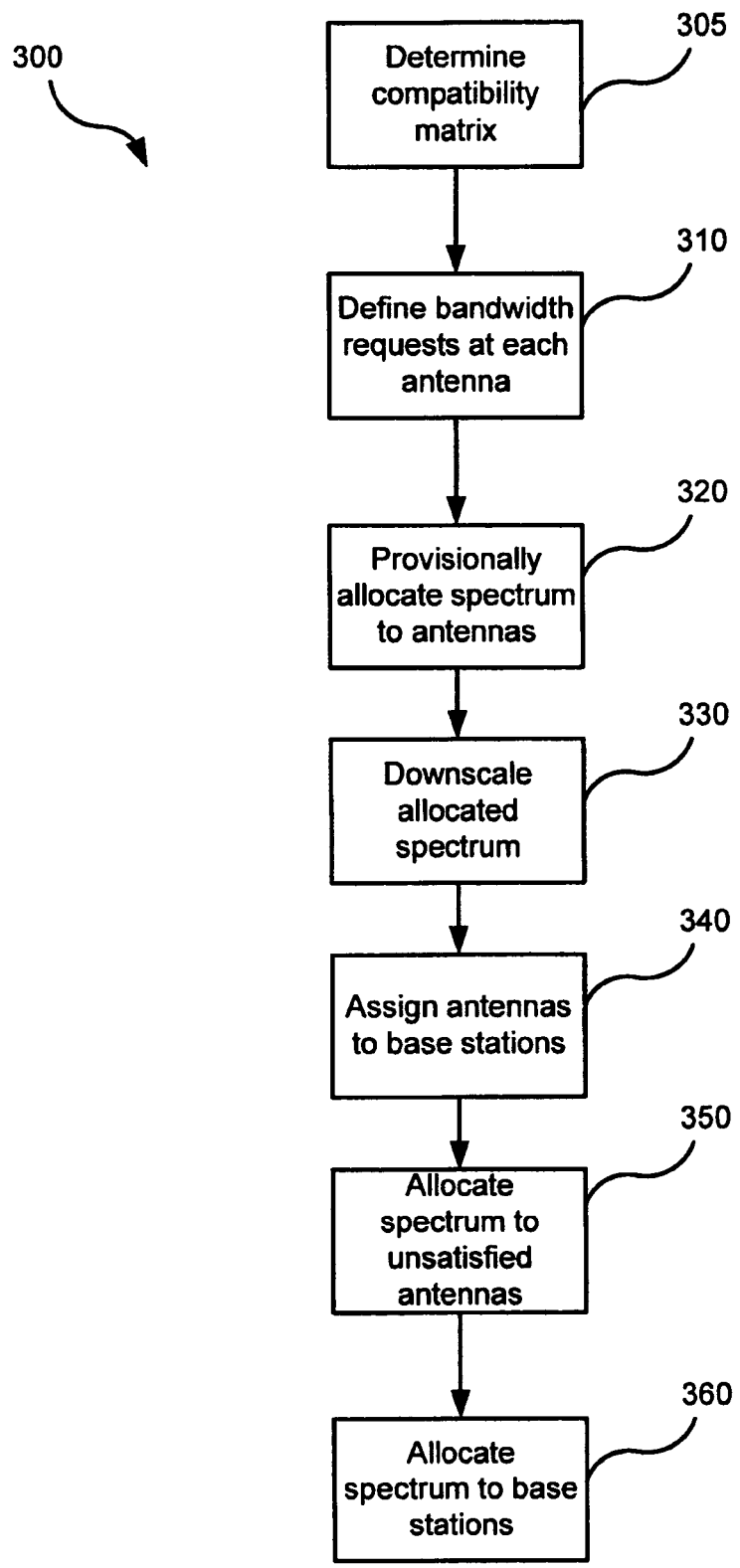
FIG. 3 is a flow chart illustrating a method of adaptively configuring the system of FIG. 1.

FIG. 3 is a flowchart illustrating a method 300 of adaptively configuring the system 100 of FIG. 1 according to one embodiment. The method 300 is carried out by the wireless switching module 120 at the start of each configuration interval. The method 300 is suitable for Case I base stations.

The method 300 starts at step 305 where the wireless switching module 120 determines a K-by-K compatibility matrix CM defined by the geographical locations of antennas 130-$i$. The compatibility matrix CM encapsulates the compatibility constraints of the antennas 130-$i$. Since the antennas 130-$i$ are fixed in location, step 310 need only be carried out once and the compatibility matrix CM stored for use in subsequent passes through the method 300 for as long as the antennas 130-$i$ remain fixed.

The (i,j)-th entry of the compatibility matrix CM depends on whether antennas 130-$i$ and 130-$j$ are compatible, i.e. can transmit/receive in the same channel without interference. If they can, CM(i,j)=1; otherwise, CM(i,j)=0.

Next, at step 310, the wireless switching module 120 computes a bandwidth requirement amount $r_i$ (i=1, . . . , K) associated with each antenna 130-$i$ for the current configuration interval.

The implementation of step 310 depends on the deployment scenario. Under Case I, each antenna 130-$i$ exclusively occupies particular channels of its connected base station for both transmitting and receiving. The OMC device 150 is thus able to identify the channels and therefore the associated antennas the bandwidth requests come through. The wireless switching module 120 uses this information to compute the bandwidth requirements of each antenna 130-$i$.

Under Case II, due to RF signal combining, a base station 110-$n$ cannot identify the channels a particular antenna 130-$i$ connected to it is using. Two types of information are gathered to compute the antennas' bandwidth requirements:

The wireless switching module 120 obtains base station-specific bandwidth requirement values from the OMC device 150.

If multiple antennas 130-$i$ are connected to a common base station 110-$n$, the wireless switching module 120 measures each antenna's receiving power. (Given a power spectrum density (PSD) of received signals, which is usually stable due to power control, the total power is proportional to the bandwidth requirement.)

The two types of information are processed jointly by the wireless switching module 120 to compute the antenna-specific bandwidth requirement amounts $r_i$.

At the following step 320, the wireless switching module 120 provisionally allocates spectrum to the antennas 130-$i$ for the current configuration interval based on the compatibility constraints on the antennas 130-$i$ and the bandwidth requirement $r_i$ associated with each antenna 130-$i$ for the current configuration interval. The method carried out at step 320 will be further described below with reference to FIG. 4.

The method 300 then proceeds to step 330 at which the wireless switching module 120 downscales the provisional spectrum allocations made at step 320 to ensure the available bandwidth is not exceeded. In the following step 340, the wireless switching module 120 assigns each antenna 130-$i$ for connection to one base station 110-$n$ based on the provisional spectrum allocations to each antenna 130-$i$. The method carried out at step 340 will be further described below with reference to FIG. 5.

At the next step 350 of the method 300, the wireless switching module 120 allocates spectrum to any antenna(s) 130-$i$ that are not fully satisfied, i.e. do not have sufficient provisionally allocated spectrum to satisfy the associated bandwidth requirements. The method carried out at step 350 will be further described below with reference to FIG. 7. Finally, at step 360, the wireless switching module 120 allocates spectrum to each base station 110-$n$ based on the spectrum allocated to each antenna 130-$i$ assigned to that base station 110-$n$ in the previous steps 310 to 350. The configuration of the system 100 is then complete and the method 300 concludes.

Figure 4:
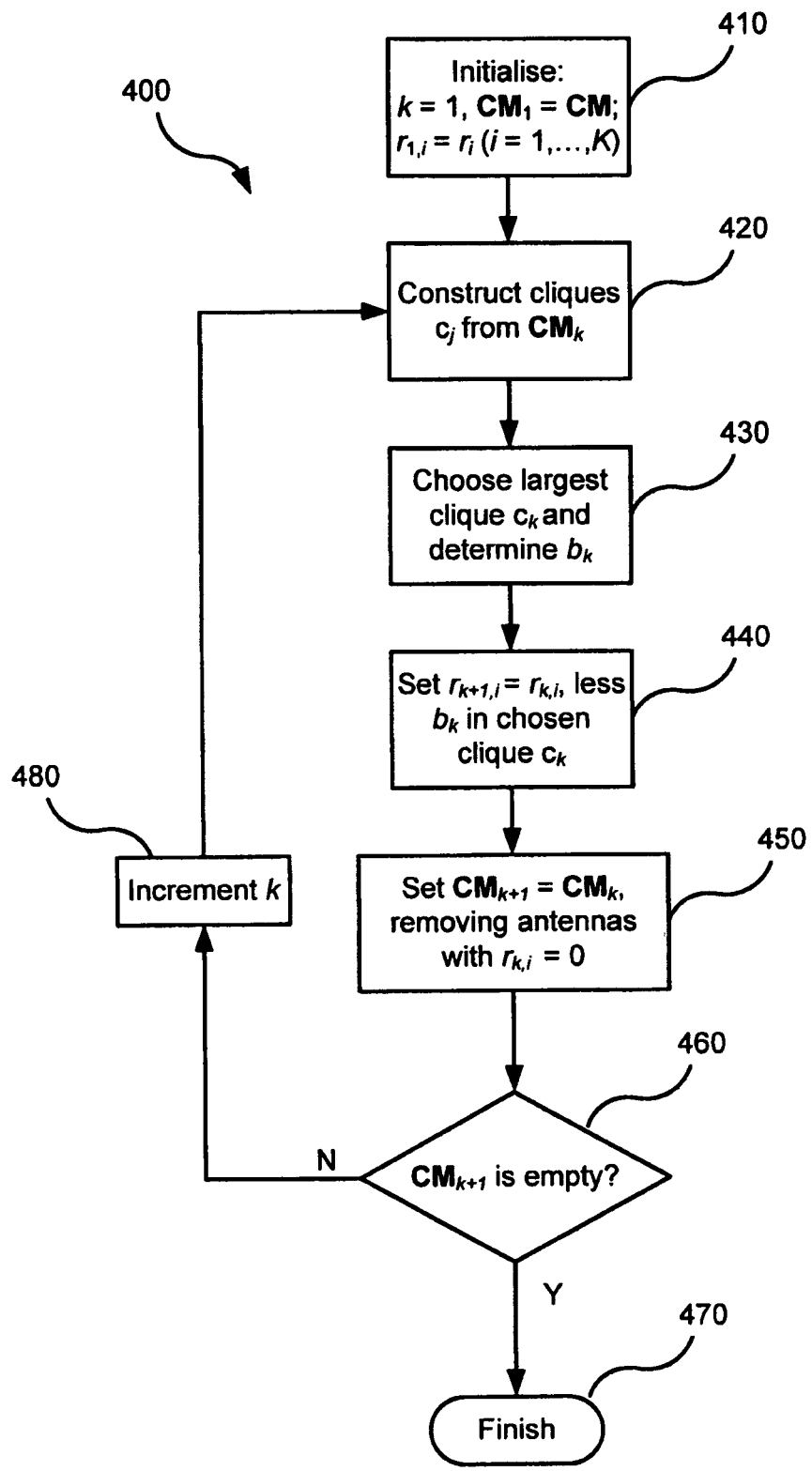
FIG. 4 is a flow chart illustrating a method of allocating spectrum to antennas, as used in the method of FIG. 3.

FIG. 4 is a flow chart illustrating a method 400 of provisionally allocating spectrum to antennas 130-$i$, as carried out by the wireless switching module 120 in step 320 of the method 300 of FIG. 3. The inputs to the method 400 are the compatibility matrix CM and the bandwidth requirement amount $r_i$ (i=1, . . . , K) associated with each antenna 130-$i$. The aim of the method 400 is to maximise the satisfaction of the bandwidth requirements $r_i$, subject to the compatibility constraints on the antennas 130-$i$ and the available bandwidth.

The method 400 begins at step 410, where certain variables are initialised: a channel counter k to 1, a matrix $CM_1$ to CM, and residual bandwidth requirements $r_{k,i}$ to $r_i$ (i=1, ..., K). The matrix $CM_k$ defines a compatibility graph CMG wherein each node represents an antenna 130-$i$, and an edge exists between two antennas 130-$i$ and 130-$j$ if they are compatible, i.e. CM(i,j)=1. At the next step 420, the cliques $c_j$ of the compatibility graph CMG defined by $CM_k$ are constructed. A clique $c_j$ is a subset of the vertices of CMG (or equivalently, a subset of the set of integers {1, ..., K}) such that each pair of vertices in the clique $c_j$ are connected by an edge in CMG. The antennas 130-$i$ represented by the nodes in each clique $c_j$ are all mutually compatible.

The method 400 then proceeds to step 430, at which the wireless switching module 120 determines the largest clique $c_k$, and sets a provisional allocation amount $b_k$ to the minimal residual requirement $r_{k,i}$ over the chosen clique $c_k$:

$$b_k = \min_{i \in c_k} r_{k,i}$$

An amount of spectrum equal to $b_k$ in channel k is provisionally allocated to all antennas in the chosen clique $c_k$. At the next step 440, new residual requirements $r_{k+1,i}$ are determined as follows:

$$r_{k+1,i} = \begin{cases} r_{k,i} - b_k, & i \in c_k \\ r_{k,i} & \text{otherwise} \end{cases}$$

That is, the residual requirement $r_{k,i}$ for each antenna 130-$i$ in the chosen clique $c_k$ is reduced by the provisional allocation amount $b_k$, while the residual requirements for the other antennas remain unchanged. At least one antenna 130-$i$ in the chosen clique $c_k$ thereby has its residual requirement $r_{k,i}$ reduced to zero.

Step 450 follows, at which a new compatibility matrix $CM_{k+1}$ is determined by removing from $CM_k$ each row and column corresponding to an antenna that is fully satisfied, i.e. whose residual requirement $r_{k,i}$ has reached zero. Because there must be at least one such antenna 130-$i$ in every iteration k, $CM_{k+1}$ must be smaller than $CM_k$.

At step 460, it is determined whether $CM_{k+1}$ is null, i.e. contains no rows or columns. If so, the method 400 concludes (470); otherwise, the method 400 increments k (step 480) and returns to step 420 for the next iteration. At the end of the method 400, all antennas 130-$i$ are fully satisfied, and the number k of iterations, which is the number of channels containing provisionally allocated bandwidth, is denoted as $K_W$.

The outcome of the step 320 is the list of chosen cliques $c_k$ and a column vector b of provisional allocation amounts $b_k$ in each channel k=1, ..., $K_W$. Defining a $K_W$-by-K binary "occupation matrix" C such that each row k has K binary entries indicating which antennas 130-$i$ belong to the clique $c_k$, the i-th column $v_i$ (the "channel occupation vector" of antenna 130-$i$) of C indicates occupation of channels 1 to $K_W$ by the corresponding antenna 130-$i$.

Step 320 provisionally allocates spectrum to antennas regardless of the available bandwidth in each channel. In step 330, the wireless switching module 120 downscales the provisionally allocated spectrum vector b by dividing b by the "utilisation ratio" ratio U, defined as the total bandwidth provisionally allocated in the step 320 to the total available bandwidth B, if the utilisation ratio is larger than 1:

$$U = \frac{\sum_{k=1}^{K_W} b_k}{B}$$

The satisfaction ratio $P_i$ is defined for each antenna 130-$i$ as the ratio of provisionally allocated spectrum to the bandwidth requirement associated with that antenna 130-$i$:

$$P_i = \frac{1}{r_i} b^T v_i$$

Before the downscaling step 330, the satisfaction ratio $P_i$ was equal to one for all antennas 130-$i$. After the downscaling step 330, the satisfaction ratio $P_i$ may have been reduced (by U), but is still the same for all antennas 130-$i$. The wireless switching module 120 has therefore maximised the minimal satisfaction ratio $P_i$ across all antennas 130-$i$ within the available bandwidth B regardless of connection constraints between base stations 110-$n$ and antennas 130-$i$. However, each antenna 130-$i$ can only be connected to one base station 110-$n$. According to the Case I scenario, multiple antennas 130-$i$ can be connected to one base station 110-$n$ if their spectrum allocations do not conflict, i.e. if at most one antenna 130-$i$ is allocated spectrum in each channel. In the step 340, the wireless switching module 120 assigns antennas to base stations so as to satisfy these "connection constraints" arising from the spectrum allocations resulting from step 320.

Figure 5:
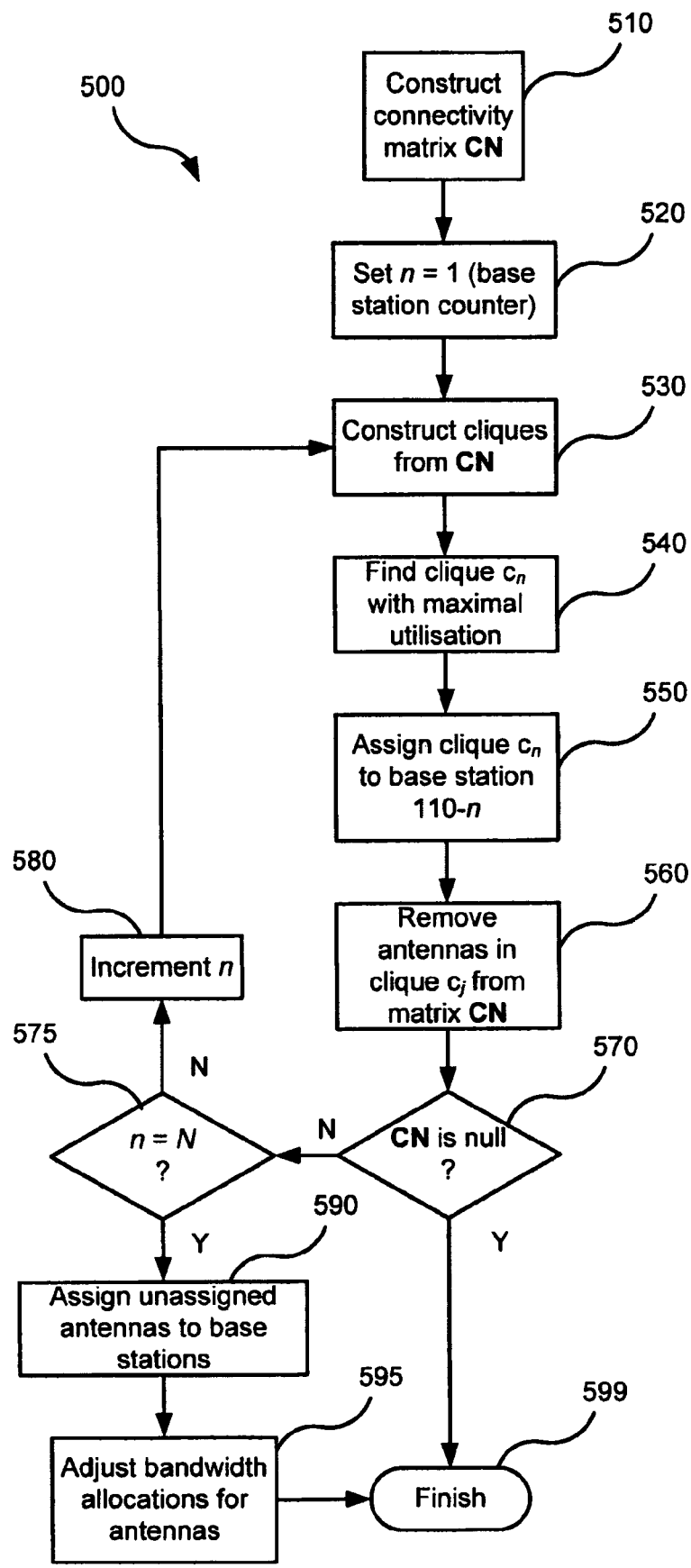
FIG. 5 is a flow chart illustrating a method of assigning antennas to base stations, as used in the method of FIG. 3.

FIG. 5 is a flow chart illustrating a method 500 of assigning antennas 130-$i$ to base stations 110-$n$, as carried out by the wireless switching module 120 in step 340 of the method 300 of FIG. 3. The method 500 begins at step 510, where the wireless switching module 120 constructs a K-by-K connectivity matrix CN that encapsulates the connection constraints mentioned above. The (i,j)-th entry in CN indicates whether antennas 130-$i$ and 130-$j$ can be connected to the same base station:

$$CN(i, j) = \begin{cases} 1, & \text{if } v_i^T v_j^T = 0 \\ 0, & \text{otherwise} \end{cases}$$

If CN(i,j) is one, antennas 130-$i$ and 130-$j$ (or their channel occupation vectors $v_i$ and $v_j$) are said to be orthogonal, and therefore can be connected to the same base station.

Next, at step 520, a base station counter n is initialised to one. In the following step 530, the cliques $c_j$ of a connectivity graph CNG defined by the connectivity matrix CN are constructed in similar fashion to step 420 of method 400. Each clique $c_j$ indicates a subset of antennas 130-$i$ whose provisional spectrum allocations are mutually orthogonal and can therefore be connected to the same base station 110-$n$.

As a side note, the connectivity graph CNG is almost complementary to the compatibility graph CMG. This because incompatible antennas must be allocated orthogonal spectrum, so no edge in CMG implies an edge in CNG. However, compatible antennas can also be allocated orthogonal spectrum (if their common clique is never chosen in step 430), so an edge in CMG doesn't imply no edge in CNG.

Step 540 follows, at which the wireless switching module 120 chooses the clique $c_n$ with the maximum amount of allocated bandwidth:

$$c_n = \underset{c_j}{\operatorname{argmax}} \left( b^T \sum_{i \in c_j} v_i(k) \right)$$

At the next step 550, the group of antennas 130-$i$ corresponding to the chosen clique $c_n$ is assigned for connection to the base station 110-$n$. At step 560, the rows and columns corresponding to the antennas 130-$i$ in the chosen clique $c_n$ are removed from the connectivity matrix CN. Step 570 tests whether the connectivity matrix CN is null. If so, all antennas 130-$i$ have been assigned to a base station 110-$n'$ and the method 500 concludes (599). In this case, all antennas are assigned to base stations such that each antenna 130-$i$ has an spectrum allocation that is orthogonal to all other antennas allocated to the same base station 110-$n$.

However, such an ideal scenario does not always occur. If CN is not null, step 575 tests whether n has reached the number N of base stations. If not, n is incremented (step 580) and the method 500 returns to step 530 to reconstruct the cliques from the reduced connectivity matrix CN. If so, the number N of base stations 110-$n$ has been exhausted and there remain some unassigned antennas 130-$j$, where $j \in \Omega \subset \{1, \ldots, K\}$. This non-ideal scenario is more likely if there are fewer antenna pairs with orthogonal spectrum allocations, which in turn is more likely if there are more compatible antenna pairs. In this case, the method 500 proceeds to step 590, at which the unassigned antennas 130-$j$ are assigned to base stations 110-$n$. Step 590 will be described in more detail below with reference to FIG. 6.

Figure 6:
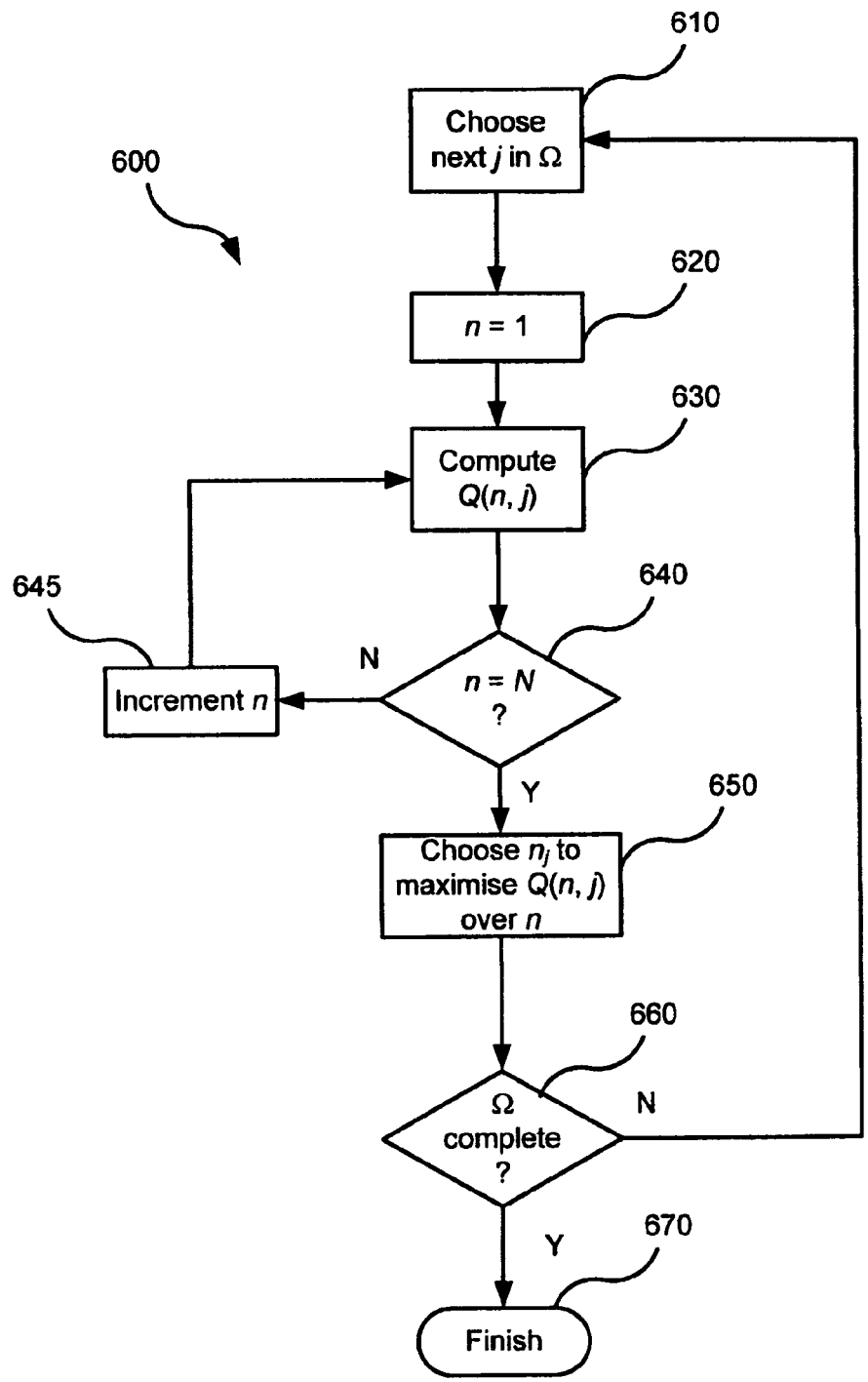
FIG. 6 is a flow chart illustrating a method of assigning unassigned antennas to base stations, as used in the method of FIG. 5.

FIG. 6 is a flow chart illustrating a method 600 of assigning unassigned antennas 130-$j$, where $j \in \Omega$, to base stations 110-$n$, as used in step 590 of the method 500 of FIG. 5. Unassigned antennas 130-$j$ cannot be orthogonal to any of the groups of antennas already assigned for connection to respective base stations 110-$n$. The aim of the method 600 is therefore to find the base station 110-$n_j$ for each unassigned antenna 130-$j$ that maximises the provisional spectrum allocation for the base station 110-$n_j$, which means finding the base station 110-$n_j$ for each unassigned antenna 130-$j$ such that the antenna 130-$j$ is "most orthogonal" to the other antennas 130-$i$ connected to that base station 110-$n$. To do this, the method 600 starts at step 610 by choosing the next unassigned antenna 130-$j$, where $j \in \Omega$. At step 620, a base station counter n is initialised to one. Step 630 follows, at which the amount of spectrum Q that would be allocated to the base station 110-$n$ if the antenna 130-$j$ were assigned to it is calculated:

$$Q(n, j) = b^T \max \left( \sum_{i \in c_n} v_i, v_j \right)$$

At step 640, the method 600 tests whether n has reached the number N of base stations. If not, n is incremented (step 645) and the method 600 returns to step 630. Otherwise, at step 650 the method 600 chooses $n_j$ so as to maximise Q(n,j) for the current value of j. The antenna 130-$j$ is assigned for connection to the corresponding base station 110-$n_j$. Step 660 follows, at which the method 600 determines whether any unassigned antennas 130-$j$ remain in the set $\Omega$. If so, the method 600 returns to step 610. If not, the method 600 concludes (670).

Recall that Case I base stations cannot share channels between assigned antennas. Since the effect of step 590 is that one or more channels are shared between antennas 130-$j$ for $j \in \Omega$ and antennas 130-$i$ already assigned to the assigned base stations 110-$n_j$, in step 595 the shared channels are subdivided into sub-bands.

In step 595, the wireless switching module 120 subdivides the channels occupied by antennas 130-$i$ assigned to the base stations 110-$n_j$ so as to maximise the minimal satisfaction ratio $P_i$ across all those antennas. (Note that the satisfaction ratios $P_i$ of antennas 130-$i$ assigned to base stations 110-$n$ not assigned to any antenna 130-$j$ for $j \in \Omega$ by the method 600 remain unchanged, so no adjustments are made by step 595 to antennas 130-$i$ assigned to those base stations.)

In step 595, the set of antennas 130-$i$ assigned to the base station 110-$n_j$ is defined as $\Theta(n_j)$. Also, an adjusted, "fractional" occupation vector $x_i$ is defined for each antenna 130-$i$ assigned to a base station 110-$n_j$. The fractional occupation vector $x_i$ is subject to the constraints that $$0 \leq x_i(k) \leq 1, k=1, \ldots, K_W$$

and $$\sum_{i \in \Theta(n_j)} x_i = \max_{i \in \Theta(n_j)} (v_i)$$

A non-integer entry $x_i(k)$ in a fractional occupation vector $x_i$ represents a subdivision of the corresponding channel k into sub-bands with width proportional to the value of $x_i(k)$. The above constraints ensure that the fractional occupation vectors $x_i$ at a base station 110-$n_j$ only have non-zero entries in channels already occupied by the antennas 130-$i$, $i \in \Theta(n_j)$, assigned to that base station, and in those occupied channels k, the occupation vector entries $x_i(k)$ sum to one. This ensures that the total bandwidth of the spectrum allocation is not increased by the step 595, and the compatibility constraints are not violated.

To maximize the minimal satisfaction ratio over all antennas 130-$i$ assigned to the base stations 110-$n_j$, all the antennas 130-$i$ assigned to each base station 110-$n_j$ should have their satisfaction ratios $P_i$ as close to each other as possible.

The adjusted occupation vectors $x_i^*$ for the antennas 130-$i$ assigned to the base station 110-$n_j$ are therefore computed in step 595 as $$x_i^* : i \in \Theta(n_j) = \underset{x_i}{\operatorname{argmin}} \sum_{m \in \Theta(n_j)} \left( \frac{1}{r_m} b^T x_m - \frac{1}{r_i} b^T x_i \right)^2$$

subject to the above constraints.

The adjusted occupation vectors $x_i^*$ may be obtained using various conventional optimisation methods, such as the gradient method.

The maximal minimal satisfaction ratio $P_c$ across all the antennas 130-$i$ assigned to the base stations 110-$n_j$ can then be obtained as follows:

$$P_c = \min_{j \in \Omega} \min_{i \in \Theta(n_j)} \left( \frac{1}{r_i} b^T x_i^* \right)$$

In the optimal case, all the antennas 130-$i$ assigned to a base station 110-$n_j$ have the identical satisfaction ratio $P_i$. The upper bound of the maximal minimal satisfaction ratio $P_c$ can thus be obtained as follows:

$$P_c^{Upper} = \min_{(n_j,j),j\in\Omega}\left(\frac{Pb^T\max\left(\sum_{i\in c_{n_j}} v_i, v_j\right)}{b^T\left(\sum_{i\in c_{n_j}} v_i + v_j\right)}\right)$$

where P is the aggregate satisfaction ratio defined as $$P = \frac{\sum_{k=1}^{K_w} b_k}{\sum_{i=1}^{K} r_i}$$

After step 595 is completed, the occupation vectors $v_i$ in the occupation matrix C are replaced by the fractional occupation vectors $x_i^*$ for $i\in\Theta(n_j)$ and $j\in\Omega$.

After step 595, the method 500 concludes (599).

If after step 340 the satisfaction ratio $P_i$ is less than 1 for any antenna 130-$i$, its bandwidth requirement $r_i$ remains unsatisfied. In step 350 of the method 300, the wireless switching module 120 allocates further spectrum to any unsatisfied antennas 130-$i$ such that no interference is introduced between incompatible antennas that are assigned to different base stations 110-$n$. This is accomplished by operating on the channel occupation matrix C as described in more detail below with reference to FIG. 7.

Figure 7:
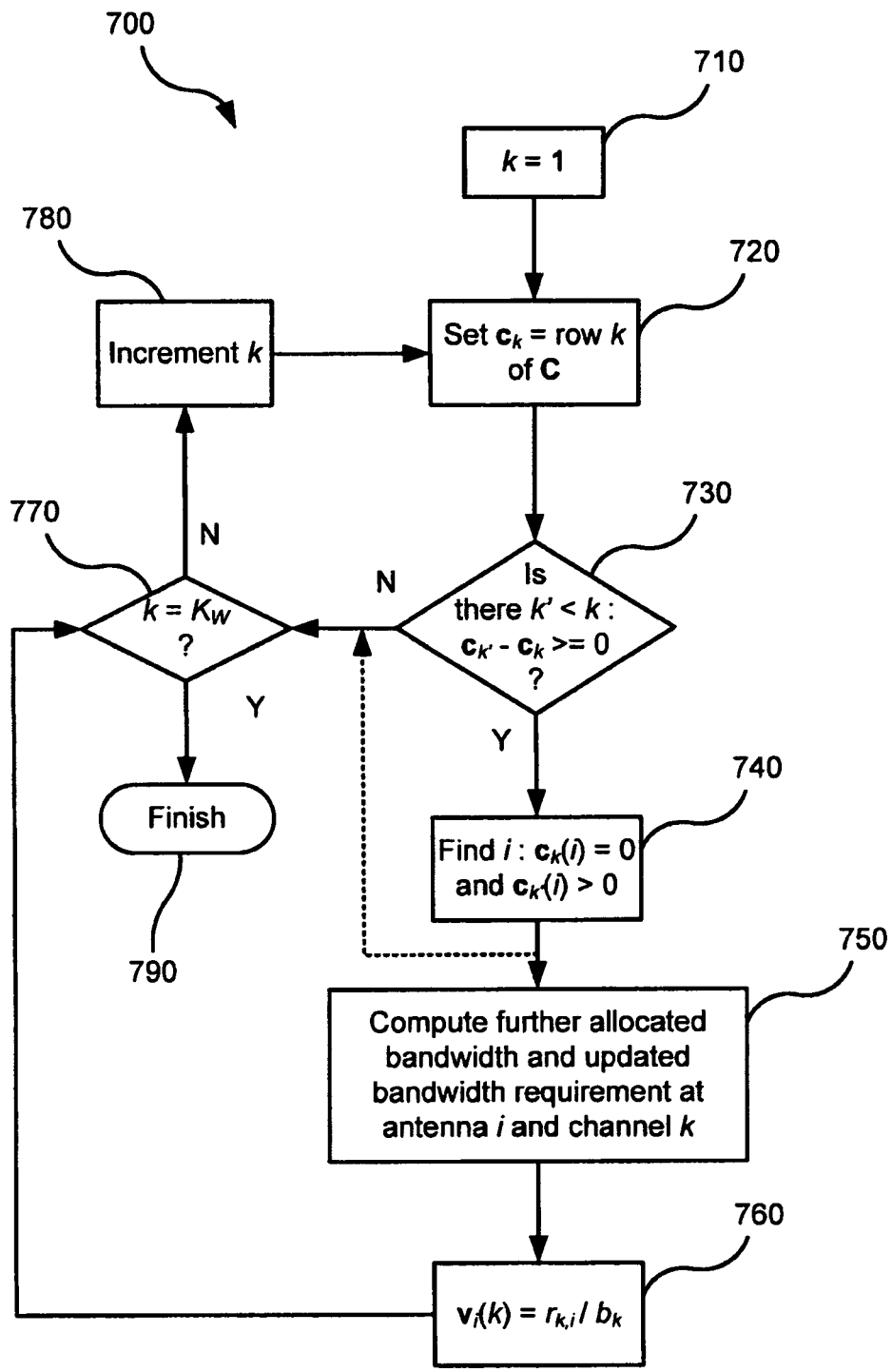
FIG. 7 is a flow chart illustrating a method of allocating further spectrum to unsatisfied antennas, as used in the method of FIG. 3.

FIG. 7 is a flow chart illustrating a method 700 of allocating further spectrum to unsatisfied antennas, as used in step 350 of the method 300 of FIG. 3. In the method 700, the wireless switching module 120 traverses the occupation matrix C row-by-row from top to bottom. The method 700 starts at step 710 where a row counter k is initialised. At the following step 720, the current row, i.e. row k, of the occupation matrix C is assigned to a vector $c_k$. Step 730 checks whether the current row is the subset of one of the upper rows (in other words, some k'<k exists such that $c_{k'}-c_k$ is non-negative in all entries). If so, more bandwidth can be allocated to the antenna 130-$i$ corresponding to the column i that has a zero in the current row k and a positive value in the upper row k'. Step 740 therefore identifies such an i.

If the identified antenna 130-$i$ has a non-zero fractional occupation entry $x_i^*(k)$ in channel k derived from the adjustment step 595, no further bandwidth is allocated to the identified antenna 130-$i$ in channel k, and the method 700 proceeds to step 770, as indicated by the dashed arrow in FIG. 7.

Otherwise, at the next step 750, the further allocated bandwidth and updated bandwidth requirement for the antenna 130-$i$ are respectively computed as $$r_{k,i}=\min(r_i-b^T v_i, b_k)$$

and $$r_i=r_i-r_{k,i}$$

Next, at step 760, the occupation vector $v_i$ for the antenna 130-$i$ is updated by replacing its k-th element (which, like $c_k(i)$, has a value of zero) with $r_{k,i}/b_k$.

Following step 760, or if no such k' was found at step 730, the next step 770 checks whether k has reached $K_W$. If not, at step 780 the value of k is incremented and the method 700 returns to step 720. If so, the method 700 concludes (790).

In the final step 360 of the method 300, the wireless switching module 120 allocates spectrum to each base station 110-$n$ based on the spectrum allocated to the antennas 130-$i$ assigned to that base station, as encapsulated in the occupation matrix C and the vector b.

Consider the available commercial Case II base stations that output the radio frequency signals. All the antennas 130-$i$, $i\in\Theta(n)$, assigned to a Case II base station 110-$n$ by the wireless switching module 120 are receiving and broadcasting identical radio frequency signals comprising all channels allocated to these antennas. There is no need for any subdivision of channels into sub-bands, and the total bandwidth for the base station 110-$n$ is $$b^T\sum_{i\in\Theta(n)} v_i.$$

However, this combined broadcast is likely to violate the antenna compatibility constraints. An alternative implementation of the method 300 suitable for Case II base stations therefore omits the adjustment step 595 from the method 500 and replaces the allocation step 350 with the method 800, described below with reference to FIG. 8, in order to allow Case II base stations to satisfy the antenna compatibility constraints.

Figure 8:
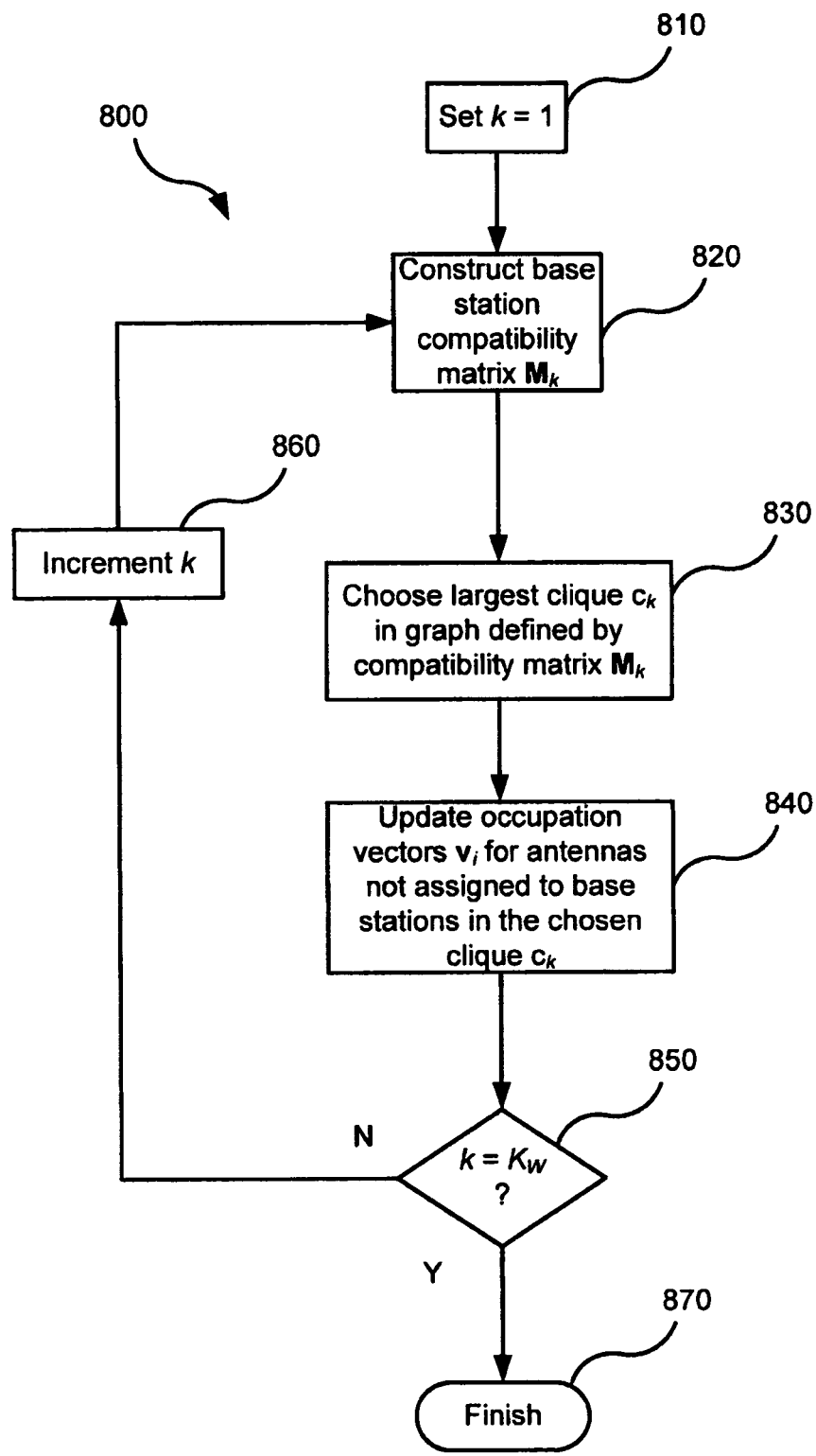
FIG. 8 is a flow chart illustrating a method of allocating channels to base stations, as used in an alternative implementation of the method of FIG. 3.

FIG. 8 is a flow chart illustrating a method 800 of allocating channels to base stations, as used in place of step 350 in an alternative implementation of the method 300. The method 800 starts at step 810 where a channel counter k is initialised to one. Denote $\Omega_{j,k}$ to be the set of antennas 130-$i$ connected to the base station 110-$j$ and occupying the current channel k. For channel k, among all the $m_k$ base stations 110-$j$ satisfying $$\sum_{i\in\Omega_{j,k}} v_i(k) > 0$$

(or in other words with an assigned antenna occupying channel k, i.e. $\Omega_{j,k}\neq\Theta$)), one or more base stations 110-$j$ are to be selected to occupy the channel k, and the other base stations and their assigned antennas will not use the channel k. To implement this, in step 820 an $m_k\times m_k$ base station compatibility matrix, $M_k$, is constructed to indicate if any two base stations can occupy the channel k. To construct $M_k$ If CM(x,y)=0 for some $x\in\Omega_{j,k}$ and $y\in\Omega_{j,k}$, set $M_k(i,j)=0$ to indicate that the antennas connected to the base stations i and j are not allowed to occupy the same channel.

If CM(x,y)=1 for all $x\in\Omega_{i,k}$ and $y\in\Omega_{j,k}$, set $M_k(i,j)=1$ to indicate that the antennas connected to the base stations i and j are allowed to occupy the same channel.

The next step 830 constructs the cliques based on $M_k$ and chooses the largest clique $c_k$. The base stations 110-$j$ in the clique $c_k$ and all the antennas 130-$i$ assigned to those base stations are selected to occupy the current channel k. The base stations 110-$j$ not belonging to the chosen clique $c_k$ and the antennas assigned to those base stations should not occupy the channel k. So in step 840, the k-th elements of the channel occupation vectors $v_i$ are set to zero for the antennas 130-$i$ assigned to the base stations 110-$j$ not belonging to the chosen clique $c_k$.

In step 850, the method 800 tests whether k has reached $K_W$. If not, the method 800 increments the channel counter k at step 860 and returns to step 820. Otherwise, the method 800 concludes (870).

The method 800, as part of the alternative implementation of the method 300, ensures that the compatibility constraints are not violated between antennas connected to different base stations. All antennas connected to a base station achieve an identical satisfaction ratio that is base station specific, and therefore the minimal satisfaction ratio is obtained by comparing those of all base stations.

By means of the adaptive configuration method 300, the wireless switching module 120 configures the wireless communication system 100 so as to maximise the minimal satisfaction ratio over all antennas 130-$i$ under the constraints of the compatibility of antennas, the fixed number of bases, and the total amount of bandwidth available. In other words, the method 300 dynamically optimises the "proportional fairness" of the system 100, in that the ratio of allocated bandwidth to required bandwidth is kept as even as possible across all antennas 130-$i$, subject to the above constraints.

The following is a non-exhaustive list of example applications of the disclosed arrangements.

1. Support of Multi-Operator Networks

Property owners provide infrastructure-switching modules, antennas and cables connecting them, and operate and maintain the networks.

Multiple operators provide base station devices.

Operators share the frequencies in a licensed band and users.

The disclosed arrangements significantly reduce the property owners' dependency on the particular operators, especially when increasing capacity and improving coverage, and also reduce the operators' investment expenditure.

2. Support of Multi-Vendor Infrastructures

Usually, vendors are asked to provide network planning and deployment on behalf of operators—this leads to operators' and property owners' dependency on the vendors. With no need of vendor-specific network planning, the base station devices provided by different vendors are able to coexist in a network according to the disclosed arrangements.

3. Support of Multiple Licensed Bands and Multiple Networks

Each antenna has a wide bandwidth covering multiple licensed bands.

Each band corresponds to a network logically independent of the others.

Either single- or multi-operator solution applies.

Independent network reconfiguration is carried out at each licensed band.

The foregoing describes only some embodiments of the present invention, and modifications and/or changes can be made thereto without departing from the scope and spirit of the invention, the embodiments being illustrative and not restrictive.

The invention claimed is:

1. A method of dynamically configuring a wireless communication system including a plurality of antennas and a plurality of base stations, each base station being configured to connect to one or more of the antennas over an available spectrum, the method comprising:

allocating one or more portions of the available spectrum to each antenna; and assigning each antenna for connection to a base station, wherein allocating one or more portions of the available spectrum to each antenna comprises:

choosing a mutually compatible subset of the antennas, wherein the subset of antennas that is chosen is a largest mutually compatible subset;

provisionally allocating an amount of spectrum in a channel of the available spectrum to the antennas in the chosen subset dependent on bandwidth requirements of those antennas in the chosen subset;

removing at least one antenna that is fully satisfied by the provisionally allocated spectrum; and repeating the choosing, provisional allocating, and removing for each channel until all the bandwidth requirements are satisfied.

2. The method of claim 1, further comprising:

downscaling the provisional spectrum portion allocations depending on a total bandwidth of the available spectrum.

3. The method of claim 1, further comprising allocating further portions of the available spectrum to each antenna that does not have sufficient allocated spectrum to satisfy the associated bandwidth requirement.

4. The method of claim 1, further comprising allocating portions of the available spectrum to base stations dependent on the assignments of antennas to base stations.

5. The method of claim 1, further comprising:

allocating portions of the available spectrum to base stations dependent on assignments of antennas to base stations and a compatibility constraint.

6. A method of dynamically configuring a wireless communication system including a plurality of antennas and a plurality of base stations, each base station configured to connect to one or more of the antennas over an available spectrum, the method comprising:

allocating one or more portions of the available spectrum to each antenna;

executing a first assigning of one or more antennas for connection to base stations such that the antennas assigned to each base station have orthogonal spectrum allocations, wherein the execution of the first assigning comprises:

choosing a subset of the antennas whose spectrum allocations are mutually orthogonal, wherein the subset of antennas chosen is a largest subset whose spectrum allocations are mutually orthogonal, assigning the antennas in the chosen subset for connection to one of the base stations, removing the assigned antennas, and repeating the choosing of the subset of the antennas, the assigning of the antennas in the chosen subset, and the removing of the assigned antennas for each base station or until all antennas have been assigned; and executing a second assigning of each unassigned antenna for connection to one of the base stations so as to maximize a spectrum allocation of the assigned base station.

7. The method of claim 6, wherein the execution of the second assigning for each unassigned antenna comprises:

choosing the base station that maximizes the amount of allocated spectrum if the unassigned antenna were assigned to that base station; and assigning the unassigned antenna for connection to the chosen base station.

8. The method of claim 6, further comprising:

after execution of the second assigning, subdividing the channels occupied by the antennas assigned to base stations during the second assigning so as to maximize a minimal satisfaction ratio over those antennas.

9. The method of claim 8, wherein the subdividing comprises:
  subdividing the channels so that the antennas assigned to base stations during the second assigning have satisfaction ratios as close to each other as possible.

10. A device in a wireless communication system comprising a plurality of antennas, a plurality of base stations, each base station configured to connect to one or more of the antennas over an available spectrum, the device configured to:
  allocate one or more portions of the available spectrum to each antenna dependent on a compatibility constraint on the antennas; and
  assign each antenna for connection to one of the base stations,
  wherein the device is configured to allocate one or more portions of the available spectrum to each antenna by:
    choosing a mutually compatible subset of the antennas, wherein the subset of antennas chosen is a largest mutually compatible subset;
    provisionally allocating an amount of spectrum in a channel of the available spectrum to the antennas in the chosen subset dependent on the bandwidth requirements of those antennas in the chosen subset;
    removing at least one antenna that is fully satisfied by the provisionally allocated spectrum; and
    continuing to choose a mutually compatible subset, provisionally allocate an amount of spectrum, and remove at least one antenna that is fully satisfied until all bandwidth requirements are satisfied.

11. The device according to claim 10 configured to compute the bandwidth requirements from a received power from each antenna.

12. A device in a wireless communication system comprising a plurality of antennas and a plurality of base stations, each base station configured to connect to one or more of the antennas over an available spectrum, the device configured to:
  allocate one or more portions of the available spectrum to each antenna;
  execute a first assigning of one or more antennas for connection to base stations such that the antennas assigned to each base station have orthogonal spectrum allocations, wherein the device when executing the first assigning is further configured to:
    choose a subset of the antennas whose spectrum allocations are mutually orthogonal, wherein the subset of antennas chosen is a largest subset whose spectrum allocations are mutually orthogonal,
    assign the antennas in the chosen subset for connection to a base station,
    remove the assigned antennas, and
    continue to choose the subset of antennas, assign the antennas in the chosen subset, and remove the assigned antennas until all antennas have been assigned; and
  execute a second assigning of each unassigned antenna for connection to a base station so as to maximize the spectrum allocation of the assigned base station.

* * * * *